Figure 1:
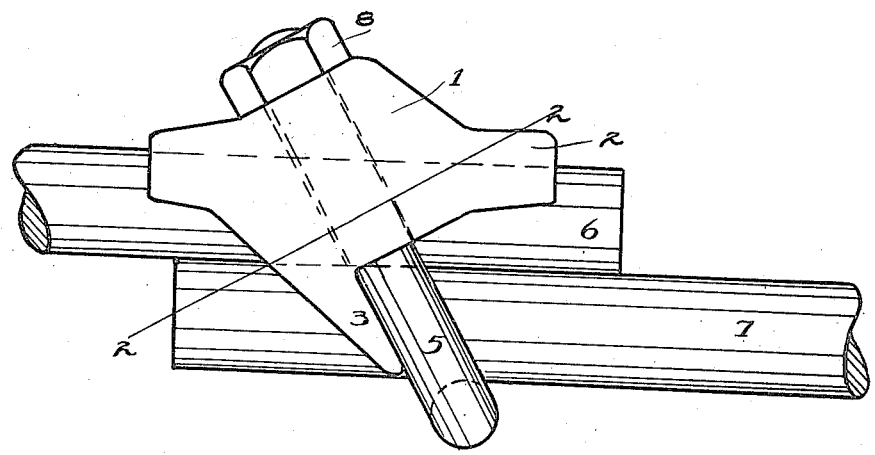

B. M. MATHIAS.
ROD CLAMP.
APPLICATION FILED JULY 7, 1917.

1,260,567.

Patented Mar. 26, 1918.

Inventor:
Berton M. Mathias
by C. H. Enochs
Attorney

UNITED STATES PATENT OFFICE.

BERTON M. MATHIAS, OF MINNEAPOLIS, MINNESOTA.

ROD-CLAMP.

1,260,567.  Specification of Letters Patent.  Patented Mar. 26, 1918.

Application filed July 7, 1917.  Serial No. 179,284.

*To all whom it may concern:*

Be it known that I, BERTON M. MATHIAS, a citizen of the United States, and a resident of Minneapolis, in the county of Hennepin and State of Minnesota, have invented certain new and useful Improvements in Rod-Clamps, of which the following is a specification.

One object of my invention is to provide in a rod clamp using only a single clamping bolt, means for transmitting part of the stress in spliced rods through the clamping bolt instead of all through the friction between the rods.

Another object of my invention is to provide in a rod splicing clamp having a clamping bolt positioned at an acute angle to the spliced rods, means for preventing the bolt from being drawn out of its angular position when it is tightened on the rods and clamp.

Another object of my invention is to provide in a rod clamp a reinforcing support for the clamping bolt.

With these and incidental objects in view the invention consists of certain novel features of construction and combination of parts, the essential elements of which are hereinafter described with reference to the drawing which accompanies and forms a part of this specification.

Figure 2:
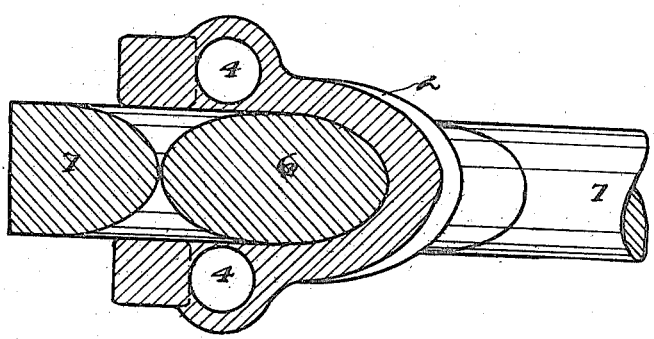

In the drawing Figure 1 is a side elevation of my improved clamp applied to a pair of rods, and Fig. 2 is a section taken on the line 2—2, Fig. 1.

In the preferred embodiment of my clamp I provide a body 1 preferably of forging or maleable casting having a rod receiving channel 2 and a bolt reinforcing lip 3, the body having apertures 4 for passing therethrough a U bolt 5.

When the clamp is placed on a pair of rods such as 6 and 7 and the U bolt drawn up by means of the nuts 8, the reinforcing member 3 prevents the U bolt from being bent and assuming a position at right angles to the rod, as it would tend to do without restraint.

With the bolts drawn up in the clamp in the angular position shown in Fig. 1, the rods are not only clamped tightly together but the stress is assumed to a considerable extent directly by the rods and there is no tendency for the bolt to be bent under strain.

While I have described my invention and illustrated it in one particular design, I do not wish it understood that I limit myself to this construction, as it is evident that the application of my invention may be varied in many ways within the scope of the following claims.

Claims:

1. In a rod clamp the combination of a body having a rod receiving channel and a forked extension for reinforcing a bolt, and means for drawing a pair of rods together against said body.

2. In a rod clamp the combination of a body, a lip extending therefrom and adapted to partly encircle one of a pair of rods to which said body is applied, a second lip extending therefrom as a fork to receive between the two prongs of the fork the rods to be spliced, a bolt, and an aperture extending through said body to receive said bolt, the surface of said aperture at one side coinciding with the surface of said forked lip.

3. In a rod clamp the combination of a body, a lip extending therefrom and adapted to partly encircle one of a pair of rods to which said body is applied, a second lip extending therefrom as a fork to receive between the two prongs of the fork the rods to be spliced, said body having an aperture extending therethrough at an acute angle to the rods clamped therein, and a bolt positioned in said aperture to clamp the rods to said body.

4. In a rod clamp the combination of a body having a rod receiving channel, a reinforcing bolt and a fork extension for reinforcing said bolt, and having an aperture passing therethrough for receiving therein said reinforcing bolt, said aperture being positioned at an acute angle to rods clamped in said body.

BERTON M. MATHIAS.

Copies of this patent may be obtained for five cents each, by addressing the "Commissioner of Patents, Washington, D. C."